April 28, 1953 A. F. HICKMAN 2,636,544
SEAT
Filed Sept. 2, 1948 5 Sheets-Sheet 1
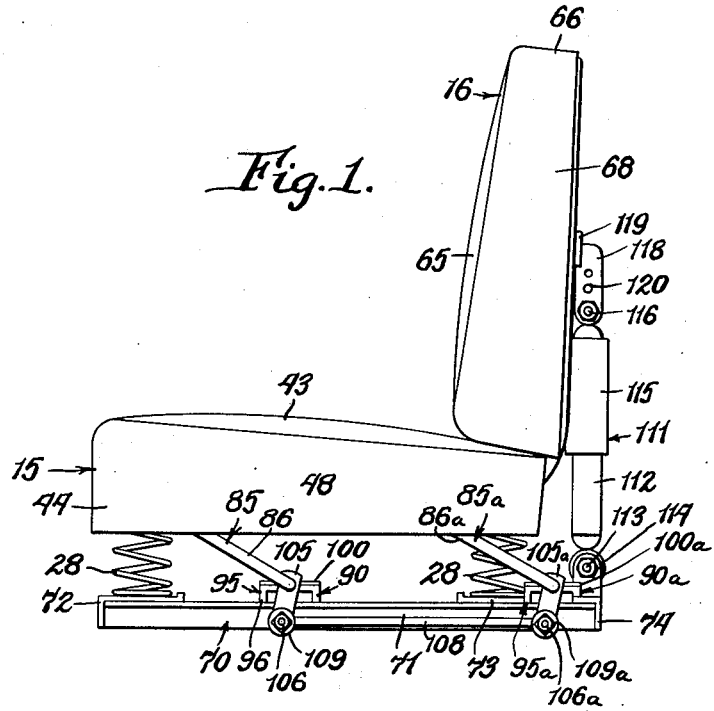
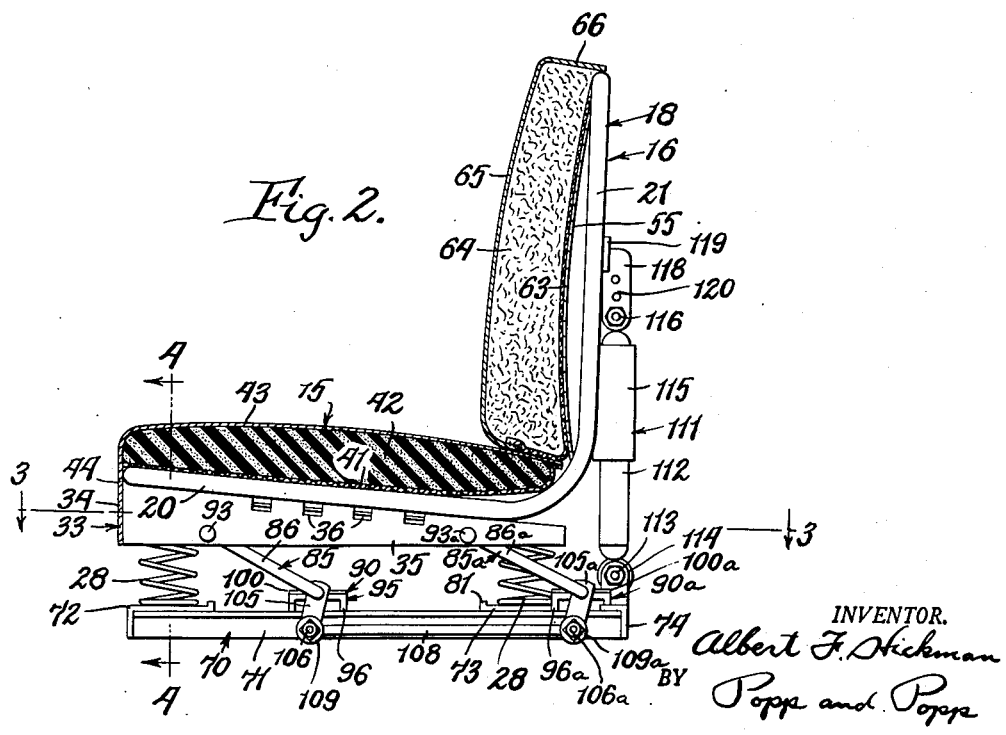
INVENTOR.
Albert F. Hickman
BY Popp and Popp
Attorneys.

April 28, 1953        A. F. HICKMAN        2,636,544
SEAT
Filed Sept. 2, 1948        5 Sheets-Sheet 2
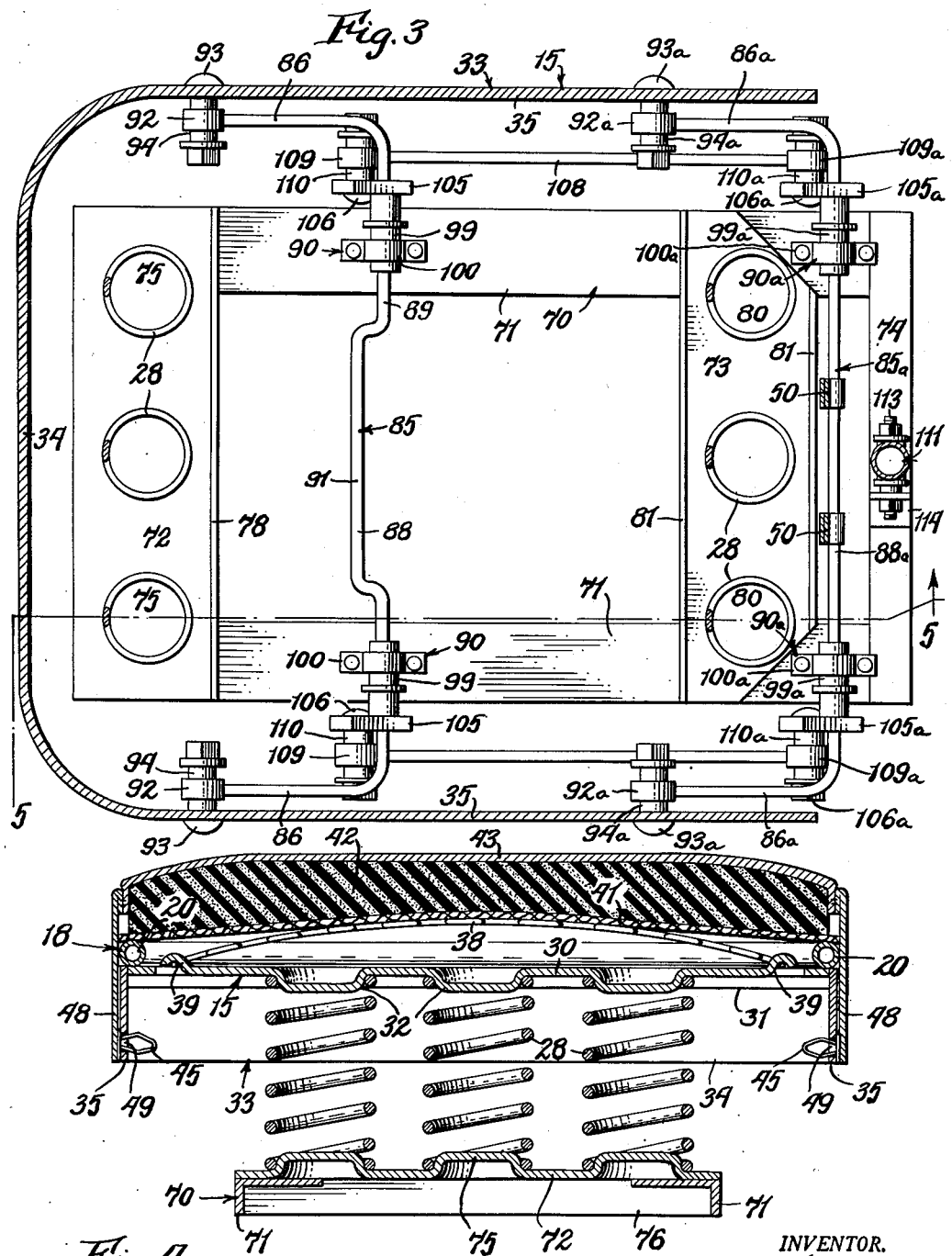
INVENTOR.
Albert F. Hickman
BY Popp and Popp
Attorneys.

April 28, 1953     A. F. HICKMAN     2,636,544
SEAT

Filed Sept. 2, 1948     5 Sheets-Sheet 3

INVENTOR.
Albert F. Hickman
BY Popp and Popp
Attorneys.

April 28, 1953  A. F. HICKMAN  2,636,544
SEAT
Filed Sept. 2, 1948  5 Sheets-Sheet 4
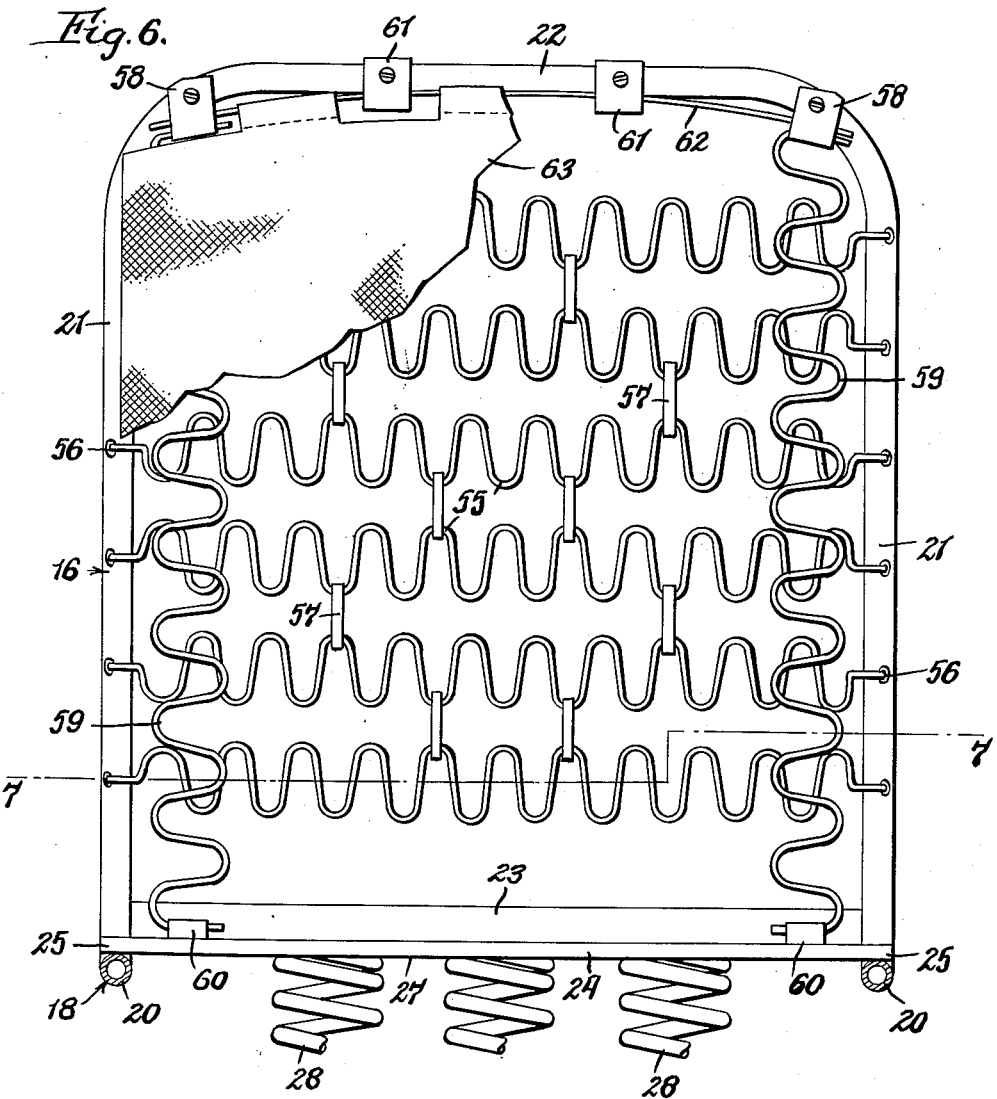
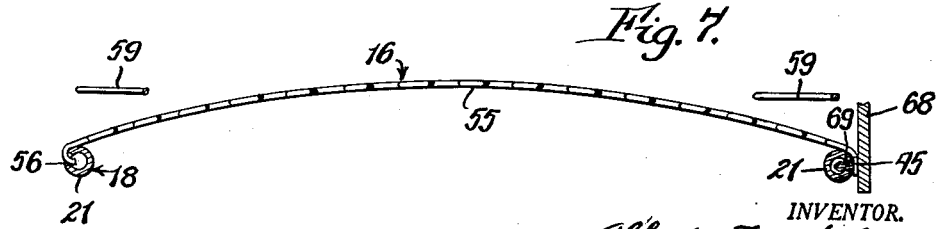
INVENTOR.
Albert F. Hickman
BY Popp and Popp
Attorneys.

April 28, 1953 A. F. HICKMAN 2,636,544
SEAT
Filed Sept. 2, 1948 5 Sheets-Sheet 5
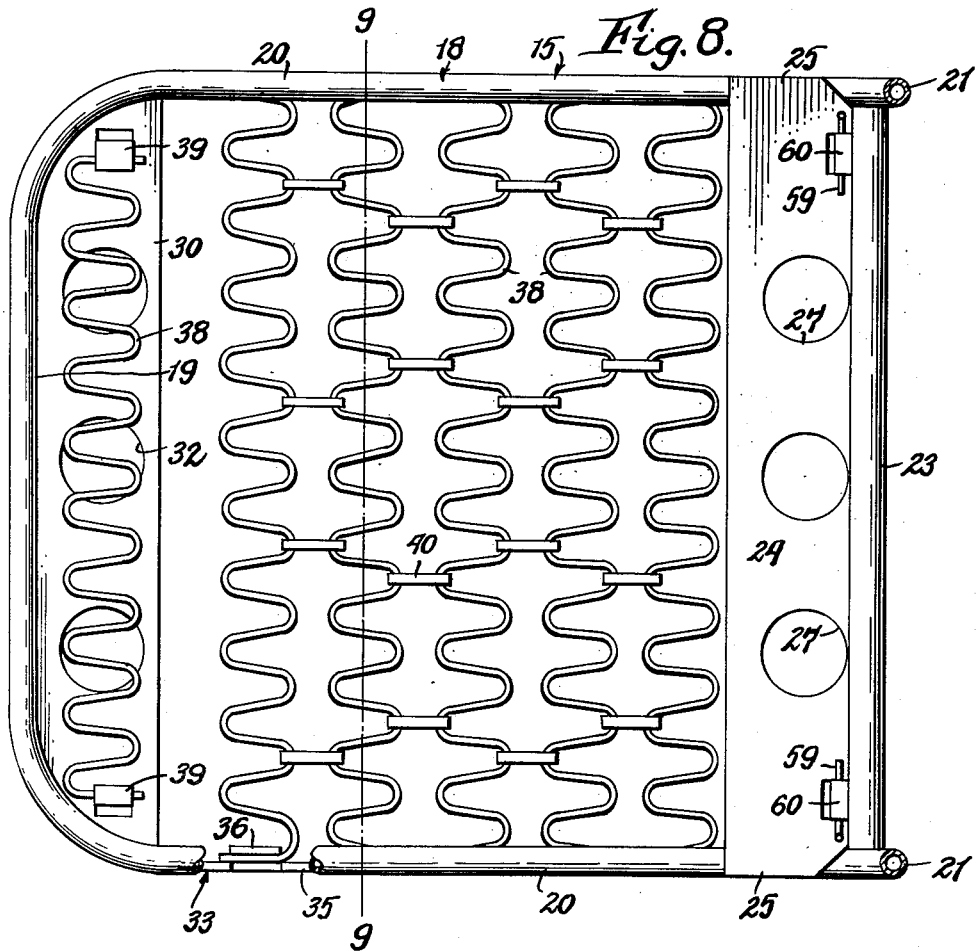
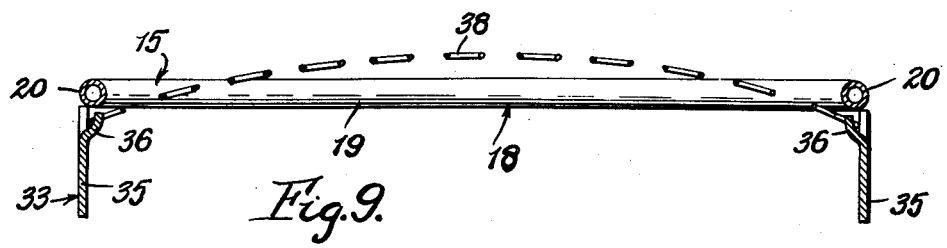
INVENTOR.
Albert F. Hickman
BY Popp and Popp
Attorneys.

Patented Apr. 28, 1953

2,636,544

UNITED STATES PATENT OFFICE 2,636,544

SEAT

Albert F. Hickman, Eden, N. Y., assignor to Hickman Industries, Inc., Eden, N. Y., a corporation of New York Application September 2, 1948, Serial No. 47,390

2 Claims. (Cl. 155—9)

This invention relates to a seat and more particularly to a resiliently mounted floating chair-type seat, particularly adapted for use in vehicles such as trucks, buses, locomotive cabs, pleasure cars, airplanes and the like, to cushion the driver or passenger against objectionable or harmful shocks, jars and vibrations caused by the vehicle passing over uneven roads or rails, or, in the case of airplanes, in landing. The floating chair-type seat forming the subject of the invention is, however, also available for use in boats or on vibrating stationary machinery, or wherever a resiliently mounted seat is desirable.

The present invention is an improvement on the seat disclosed in my Patent 2,357,825, granted September 12, 1944, for a Seat.

In common with the seat shown in my said prior patent, objects of the invention are to provide a seat which has superior ride characteristics; which provides the maximum vertical movement of the frame without interference, and absorbs objectionable jars and vibrations of all frequencies; in which the suspension is arranged below the seat; which is composed of simple parts and of a construction adapted to mass production; which is strong and durable in construction and will operate smoothly and easily without damage; which is light in weight; and which is free from projecting parts adapted to injure the rider or interfere with its installation.

A specific object of the present invention is to provide such a seat which has the appearance of luxurious comfort and in particular has the appearance of very deep seat and back cushions and at the same time is so constructed that the vertical forces are essentially resiliently resisted by a spring support arranged below the seat frame rather than through the seat cushion.

Another object of the invention is to provide a spring support for such a seat in which the seat can be supported on a multiplicity of widely spaced springs and in which the springs are so arranged as not to interfere with the other moving parts of the spring support.

Another object of the invention is to provide such a spring support in which any of the supporting springs can be readily removed or replaced, thereby permitting of incorporating the particular number of springs required for any particular installation.

Another important object of the invention is to provide such a seat which is applicable without alteration to a wide range of automotive vehicle cabs, thereby to facilitate its use both as standard and accessory equipment in the automotive field.

Another object of the invention is to provide a spring support which is of extremely light but at the same time durable construction and which positively guides all parts of the seat frame to move in a substantially vertical path without fore-and-aft rocking, or lateral tipping.

Another object is to provide a seat which can move below the level of the spring supporting members and without contact of the seat pad structure with any underframing, thereby to avoid any direct jolt against the body.

Another object is to provide such a seat in which the normal initial elevation of the seat can be readily adjusted to suit different cabs.

Another object of the invention is to provide a simplified and non-sagging form of seat and back cushion springs which will not sag or distort under conditions of severe use.

Another object is to provide upholstering, including a cover, cushion or pad and bottom cloth which are independently and easily replaceable.

Another object is to provide such a seat, any part of which can be easily removed and replaced.

Other objects and advantages will appear from the following description and drawings in which:

Fig. 1 is a side elevational view of a resiliently mounted chair type seat embodying the present invention.

Fig. 2 is a vertical fore-and-aft section, this section being taken through the upholstery and showing the metal framework in elevation.

Fig. 3 is an enlarged horizontal section taken generally on line 3—3, Fig. 2, and looking downwardly.

Fig. 4 is an enlarged vertical transverse sectional view taken on line 4—4, Fig. 2.

Fig. 6 is a fragmentary front elevational view of the back part of the chair frame, most of the upholstery being removed to disclose the construction of the metal spring structure and framework.

Fig. 7 is a horizontal sectional view taken on line 7—7, Fig. 6.

Fig. 8 is a top plan view of the seat part of the chair frame with the upholstery removed to disclose the spring structure and frame construction, the tube connection between this seat part and the back part being shown in section.

Fig. 9 is a vertical section taken on line 9—9, Fig. 8.

Figure 5:
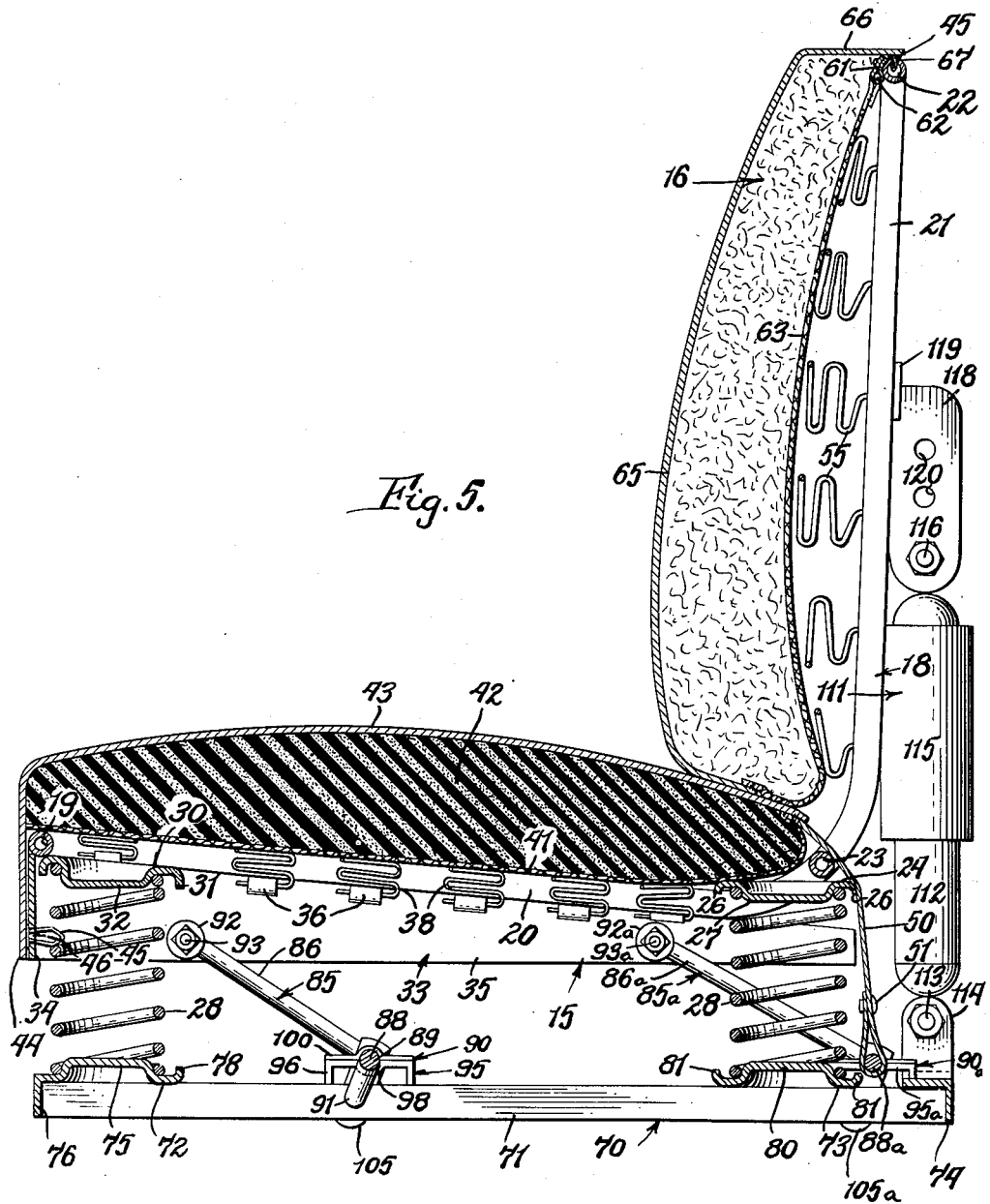
Fig. 5 is a vertical fore-and-aft section taken on line 5—5, Fig. 3.

The seat forming the subject of the invention is of the type comprising a cushioned chair-like seat frame having a back part which is relatively rigidly connected with a seat part thereof, a support or subframe adapted to be secured to the body of the vehicle, and a resilient spring suspension between the chair-like seat frame and the support or subframe and which resiliently supports the chair-like seat frame and permits resilient, guided movement of the seat frame relative to the subframe.

The cushioned chair-like seat frame is shown as comprising a seat part indicated generally at 15 and a back part indicated generally at 16 and which is rigidly connected to the seat part 15 through a tube 18 which is bent to provide jointly the side members and top and forward cross members of the chair-like seat frame, the ends of this tube being welded together to provide an endless tubular structure. This tube 18 extends along the front of the seat part 15, as indicated at 19, thence rearwardly along the sides of the seat part 15 as indicated at 20, thence upwardly along the sides of the back part 16 as indicated at 21, and thence horizontally across the top of the back part 16 as indicated at 22. At the juncture between the seat part and back part of the chair frame, the opposite sides of this tube 18 are connected by a cross tube 23 suitably welded at its opposite ends to the bends between the parts 20 and 21 of the tube 18 and preferably disposed slightly above a plane coincident with the top surfaces of the side parts 20 of the tube 18.

This arrangement of the cross tube 23 accommodates a transverse rear top spring plate 24 which is arranged below this cross tube 23 lengthwise thereof and which is provided with end extensions 25 at its forward side which rest on and are preferably welded to the side parts 20 of the seat part of the tube 18. This transverse rear top spring plate is downwardly flanged along its front and rear edges, as indicated at 26, and is also provided with circular downwardly extending depressions or offsets 27 which enter and center the upper ends of a rear row of helical compression springs 28 serving to provide the yielding support for the chair-like seat frame.

A transverse front top spring plate 30 is welded at its opposite ends to the under sides of the side parts 20 of the seat part of the tube 18 and is arranged immediately in rear of the front cross part 19 of this tube. As with the rear top spring plate 24, the front top spring plate 30 is downwardly flanged along its front and rear edges, as indicated at 31, and is also provided with circular downwardly extending depressions or offsets 32 which enter and center the upper ends of a front row of the helical compression springs 28 serving to provide the yielding support for the chair-like seat frame. It will be observed that this arrangement and attachment of the spring plates 24 and 30 locates the front and rear row of helical supporting springs 28 for the chair-like seat frame at the forward extremities of the seat part 15 thereof, thereby to leave the space therebetween free for the action of the other mechanisms as hereinafter described.

A metal apron 33 is welded along its upper edge to the under side of the front cross part 19 and side parts 20 of the seat part of the tube 18, this apron being U-shaped in horizontal section for this purpose to provide a forward cross part 34 welded to the cross part 19 and rearwardly extending side arms 35 welded to the side parts 20 of the tube 18. The rearwardly extending side arms 35 of the depending metal apron 33 are preferably of rearwardly tapering form and each is provided along its upper edge with a series of spaced fingers 36 which extend inwardly and upwardly therefrom and are preferably provided by offsetting corresponding portions of the metal of the horizontally extending side arms 35 of the depending metal apron 33.

Corresponding pairs of these fingers 36 on opposite sides of the seat frame engage and support the opposite ends of cushion springs 38. Each of these springs 38 is in the form of a sinusoidal length of spring wire with its undulations arranged parallel with the cushion surfaces and, except for the foremost spring 38, with its ends bent to fit into and be supported by the corresponding pair of fingers 36 at opposite sides of the chair frame. The foremost of these sinusoidal cushion springs 38 is disposed above the spring plate 30 and has its ends inserted into fingers 39 struck upwardly from the opposite ends of this cross plate 30. These seat cushion springs 38 arch upwardly and can be interconnected at suitable intervals by metal clips or ties 40 in a conventional manner.

The cushion springs 38 are upholstered, and for this purpose a piece 41 of heavy canvas is arranged on top of these springs, this piece of canvas corresponding to the shape of the seat part 15. On this piece 41 of heavy canvas is arranged a pad 42 of resilient material, such as rubber having numerous voids to provide a high degree of softness or resiliency, this pad also corresponding to the shape of the seat part 15. The rear edge of the piece of heavy canvas 41 extends upwardly along the rear of the rubber pad 42 and is stitched along this rear edge to a cover 43 forming the surface of the seat cushion and made of a durable non-absorbent, smooth, scuff and wear-resistant fabric or artificial leather. This cover 43 extends forwardly from its attachment to the piece 41 of heavy canvas along the upper surface of the rubber pad 42 and at its front end 44 extends downwardly along the forward face of this rubber pad and the cross part 34 of the depending metal apron 33. The lower edge of this front end 44 of the seat cover 43 is generally coincident with the lower edge of the cross part 34 of the depending metal apron 33 and is secured thereto by any suitable form of fasteners 45 secured to the front end 44 of the cover 43 along the lower end thereof and each extending into a corresponding hole 46 provided in the apron 33.

Side pieces 48 of the same material as the cover 43 are stitched to the opposite edges thereof and extend downwardly along opposite sides of the rubber pad 42 and along the outer faces of the horizontally extending side arms 35 of the depending metal apron 33. The forward edge of each of these side pieces 48 of the seat cover is also stitched to its corresponding side edge of the front end 44 of the cover 43. The lower edges of the side pieces 48 of the seat cover are generally coincident with the lower edges of the side arms 35 of the depending metal apron 33 and are secured thereto by the fasteners 45 secured to these side pieces 48 of the seat cover and extending into corresponding holes 49 provided in the apron 33.

Additionally to hold the upholstery for the seat 15 in place, a pair of elastic straps 50 are secured to the seat cover 43 and the piece of heavy canvas 41 along the line of juncture thereof. Each of these elastic straps extends over the cross tube 23 at the rear of the seat part 15 of the seat frame and is connected to the cross part 88a of the rear yoke 85a by a snap fastener 51, one part of which is secured to the extremity of the strap and mates with another part secured to an intermediate part of the strap. These straps 50 serve to resiliently draw the seat cover 43 rearwardly and hence to remove unsightly wrinkles or distortions thereof.

The back part 16 is also provided with cushion cross springs 55 each in the form of a sinusoidal length of spring wire with its undulations arranged parallel with the back cushion surface and with its opposite ends bent to enter a vertical series of holes 56 provided in the side parts 21 of the back part of the tube 18.

These back cushion cross springs 55 arch forwardly and can be interconnected at suitable intervals by metal clips or ties 57 in a conventional manner.

A feature of the back cushion resides in additional spring support at the vertical side edges of the back cushion and to this end a pair of metal eyes 58 are screwed to the front face of the upper cross part 22 of the back part of the tube 18 to provide anchorage for the bent upper ends of a pair of side back cushion springs 59. As with the other cushion springs, each of these side back cushion springs 59 is in the form of a sinusoidal length of spring wire with its undulations arranged parallel with the back cushion surface and these cushion springs 59 are disposed vertically along opposite vertical edges of the back cushion to provide increased support therefor. The lower end of each of these vertical back cushion springs 59 is bent to fit and anchor in an eye 60 struck upwardly from the corresponding end of the rear top spring plate 24.

Intermediate the end eyes 58 so secured to the front face of the upper cross part 22 of the back part of the tube 18, a pair of similar eyes 61 are similarly screwed to this upper cross part 22 of the tube 18 in alinement with each other. These eyes 61 jointly carry a rod 62 which thereby extends longitudinally along the tubular cross part 22 of the chair frame and can have its ends caught under the end eyes 58. To this rod is secured, in any suitable manner, the upper end of a piece 63 of heavy canvas which extends along the forward sides of the two side back cushion springs 59 and the horizontally extending cushion springs 55. In front of the piece 63 of heavy canvas is arranged a pad 64 of springy, resilient material such as hair, the strands of which are cementitiously united to provide an open felted structure. The lower edge of the piece 63 of heavy canvas extends horizontally forwardly under the back pad 64 and is stitched along this forward edge to a cover 65 forming the surface of the back cushion and made of a durable, non-absorbent smooth, scuff and wear-resistant fabric or artificial leather. The cover 65 extends upwardly from its attachment to the piece 63 of heavy canvas along the forward surface of the hair pad 64 and at its upper end 66 extends horizontally rearwardly along the upper side of the hair pad and is joined to the upper cross part 22 of the chair frame by any suitable form of fasteners 45 secured to the upper end 66 of the back cover 65 along the upper edge thereof and each extending into a corresponding hole 67 provided in the cross rod 22 of the chair frame.

Side pieces 68 of the same material as the back cover 65 are stitched to the opposite edges thereof and extend rearwardly along the opposite sides of the hair pad 64 to the tubular side parts 21 of the back part of the tube 18 forming the chair frame. The vertical free edges of the side pieces 68 of the back cover have suitable fasteners 45 attached thereto and anchoring in spaced holes 69 provided along each of the side parts 21 of the back part of the tubular seat frame 18.

The subframe, indicated generally at 70, is shown as comprising two fore-and-aft side rails 71 which are L-shaped in cross section and connected at their front ends by a transverse front bottom spring plate 72 and at their rear ends by a transverse rear bottom spring supporting plate 73, these parts being welded together in rectangular arrangement. In addition, the rear extremities of the side rails 71 are shown as connected by a cross angle bar 74 having its flanges fitting and welded to the ends and top flanges of the side rails 71. The subframe so formed is preferably supported for fore-and-aft adjustment on the vehicle chassis so that the driver can adjust the forward positioning of the seat to suit his requirements. As such fore-and-aft adjustment forms no part of the present invention, it is not illustrated nor described.

The transverse front bottom spring plate 72 supports the forward row of the helical compression springs 28 and for this purpose is provided with circular upwardly extending offsets 75 corresponding to the similar circular offsets or depressions 32 of the front top spring plate 30 and which offsets 75 enter and center the lower ends of the helical compression springs 28 interposed between these front spring plates. This transverse front bottom spring plate 72 is also strengthened by a downwardly projecting flange 76 along its forward edge and an upwardly projecting flange 78 along its rear edge.

The transverse rear bottom spring plate 73 supports the rearward row of the helical compression spring 28 and for this purpose is provided with circular upwardly extending offsets 80 corresponding to the similar circular offsets or depressions 27 of the rear top spring plate 24 and which offsets 80 enter and center the lower ends of the helical compression springs 28 between these rear spring plates. The front and rear edges of this transverse rear bottom spring plate are shown as strengthened by upwardly projecting flanges 81.

The chair frame is guided to move in a generally vertical direction by a pair of yokes which are constructed and secured to the side rails 71 of the subframe and the side arms 35 of the depending apron 33 of the seat frame as follows:

The front yoke 85 is in the form of a generally U-shaped metal rod having arms 86 which in the unloaded position of the seat extend forwardly and upwardly. The cross part 88 of the front yoke is formed to provide bearing portions 89 adjacent its arms 86 and journalled in bearings 90 on the base frame side rails 71. Intermediate these bearings the cross part 88 of the forward yoke is offset, as indicated at 91, downwardly and generally at right angles to the arms 86 of the yoke. To the outer end of each of the yoke arms 86 is welded a tubular eye 92 which eyes are in line with each other and each of which embraces the shank of a bolt 93 projecting inwardly from the forward end of the corresponding side arm 35 of the depending apron 33. To provide a bearing between each eye 92 and its bolt 93, a rubber sleeve 94 is held in compressive relation between these parts.

Each of the bearings 90 is shown as comprising a bottom strip 95 of metal having end legs 96 suitably welded to the corresponding side rail 71 of the subframe and having a semi-cylindrical depressed part 98 at its center to provide a lower half bearing, this lower half bearing supporting the rubber sleeve 99 in turn embracing the corresponding bearing portions 89 of the yoke. Each rubber sleeve 99 is held in compressive relation with the yoke and lower half bearing, by an upper half bearing strip 100 riveted at its opposite ends to the corresponding strip 95 and arching upwardly at its center to embrace the corresponding rubber sleeve 99.

The rear yoke 85a is identical to the front yoke 85 except that its cross part 28a is unprovided with the offset 34. The rear yoke is journaled on the rear ends of the side rails 71 of the subframe by bearings 90a identical with the bearings 90 for the front yoke and the eyes 92a of the rear yoke are journalled in the same manner as with the front yoke 85, through rubber sleeves 94a on bolts 93a projecting inwardly from the rearward end of the corresponding side arm 35 of the depending apron 33.

Since the rear yoke 85a and its bearings are substantially identical to the front yoke 85 and its bearings, the description is not repeated, the same reference numerals being applied to the rear yoke 85a and its bearings and distinguished by the suffix "a."

The yokes 85, 85a are connected to rock in unison so that all parts of the seat frame move vertically in unison. For this purpose the front yoke 85 has welded thereto a pair of relatively short depending crank arms 105, these being arranged adjacent the bearings 90 and outside of the side rails 71 of the subframe. Each of these crank arms carries a horizontal outwardly projecting bolt 106 forming a crank pin. Similarly, the rear yoke 85a has welded thereto a pair of relatively short depending crank arms 105a, these being arranged adjacent the bearings 90 and outside of the side rails 71 of the subframe. Each of these crank arms carries a horizontally outwardly projecting bolt 106a forming a crank pin.

The crank pins 106, 106a at each side of the subframe are connected by a connecting rod 108. For this purpose tubular eyes 109, 109a are welded to each end of each of these connecting rods and these eyes are fitted over the crank pins 106, 106a, a sleeve 110, 110a of rubber being compressively interposed between each eye and crank pin.

A telescopic shock absorber indicated generally at 111 is interposed between the chair frame and the subframe to reduce the effect of rebound forces. The shock absorber can be of any conventional form and is shown as vertically arranged in rear of the seat frame and as having an inner telescoping part 112 pivoted at its lower end to a bolt 113 projecting horizontally and laterally from the upstanding leg of an L-shaped bracket 114 welded centrally to the upper side of the rear cross bar 74 of the subframe. The outer telescoping part 115 of the shock absorber is pivoted to a bolt 116 projecting horizontally and laterally from a vertical bar 118 welded to a cross bar 119 of the chair frame, this cross bar 119 being welded at its ends to the parts 21 of the tubular frame 18. A series of holes 120 in the vertical bar 118 is provided for the reception of the bolt 116 and it will therefore be seen that the initial elevation of the chair frame can be readily adjusted, through the selection of the appropriate hole 120 to suit the particular vehicle chassis on which the seat is to be mounted.

The seat is shown in its normally unloaded position in which the arms 86, 86a of the two yokes 85, 85a project upwardly and forwardly, and the crank arms 105, 105a project downwardly. When the rider sits upon the seat the arms 86, 86a of the two yokes are swung downwardly slightly to a normal position, the weight of the driver being supported by the six helical compression springs 28 as well as by the eight rubber bushings 94, 94a and 110, 110a, which pivotally connect the two yokes with the seat frame and with the subframe.

When the vehicle frame is moved upwardly upon encountering a bump in the road, the weight of the occupant of the seat moves the seat frame downwardly in the path determined by the arms 86, 86a of the yokes 85, 85a, and the seat frame being held against tipping forwardly or backwardly during this downward movement. Since the arms of the two yokes connect with opposite sides of the seat frame, there is also no tendency for the seat frame to rock, tip or twist in its downward movement.

In this downward movement of the seat frame the arms of the two yokes approach and swing into the same horizontal plane. In this position of the parts the parallelogram linkage is not sufficiently stable to prevent fore-and-aft rocking of the chair frame. Further, when the arms of the two yokes pass into the same horizontal plane, the arms of the front yoke would normally be free to rotate in one direction while the arms of the other yoke would be free to rotate in the opposite direction. This would, of course, cause the seat frame to lurch to an upwardly or backwardly tipped position and also the parts would become locked in this lurched position, and render the suspension wholly useless. To avoid this, the two connecting rods 108 are provided, these connecting rods being secured to the crank arms 105, 105a of the two yokes and these crank arms being set at a different angle from the arms 86, 86a of these yokes. By virtue of this interconnection of the two yokes by the independent connecting rods 108, the yokes are always compelled to rotate uniformly in the same direction even when their arms 86, 86a are arranged in or close to the same plane the stability of the seat is maintained and there is no danger of these yokes rotating so as to throw the seat to a cocked position in which the parts interlock and render the suspension inoperative.

By the use of a pair of crank arms 105, 105a at each side of the structure and a connecting rod between each pair at each side of the structure, these crank arms can be made very short and light in weight, the shortness of these crank arms reducing the overall height of the spring suspension, as compared, for example, with the structure shown in my said Patent No. 2,357,325, thereby to facilitate the installation of the seat in a wider range of truck cabs.

It will further be noted that the seat is supported by the widely spaced transverse rows of springs 28 which can be provided in any number to secure the desired ride. At the same time these springs are so arranged as not to interfere with the operating mechanism and more particularly to leave the underside of the seat pad unobstructed so that the occupant of the seat is not brought directly against any underframing upon a severe jolt. Further, by providing the offset 91 in the forward yoke 85 the center part of this yoke is depressed under bottoming conditions so that this yoke cannot directly contact the bottom of the seat pad structure to cause discomfort.

The rebound movement of the seat is effected by the springs 28 and rubber bushings and is restricted by the shock absorber 111 which limits the upward movement of the seat frame, and it will particularly be noted that the upper connection for the shock absorber permits of adjustment of the seat for the normal or initial elevation desired for any particular cab installation. Thus, by selecting any one of the holes 120 for insertion of the bolt 116 the initial height of the seat can be adjusted as desired.

It will also be noted that the metal apron 33 serves to strengthen the seat frame, to provide anchorage for the seat suspension parts, to provide anchorage for the greater part of the sinusoidal metal seat springs 38 and also to provide a skirt to which the seat cover is secured along its lower edge. Further, by this arrangement the seat cushion has the appearance of luxurious depth even though it is composed of a comparatively thin pad and upholstery designed primarily to fit the body rather than to cushion impacts. Further, by this metal apron, there is no interference in operation of the parts of the suspension arranged below the seat and at the same time these parts are effectively concealed so as to enhance the appearance of the seat.

It will further be seen that both the seat cushion and back cushion are supported by cushion springs which are not liable to sag or break and which, for the back cushion in particular, are so arranged as to maintain the box-like form of this cushion. It will also be seen that both seat and back covers and pads can be readily removed and replaced independently of the other parts of the upholstery and that the upholstery, while completely and easily removable from the seat frame is reliably held in place thereon both through the multiplicity of fasteners 45 and the interconnection of the heavy canvas pads 41, 63 with the covers 43, 65, respectively, as well as by the elastic straps 50. It will also be noted that the elastic straps 50 serve to smooth out the surface of the seat cushion each time the user arises, the upward movement of the seat drawing these straps taut to draw the seat cover rearwardly. The elastic form of these straps establishes the shock absorber as the medium for limiting the upward movement of the seat and avoids breaking of these straps.

From the foregoing it will be seen that the present invention provides a seat which is particularly adapted for installation in commercial vehicles to provide a comfortable and healthful ride for the driver and riders of such vehicles and that the seat is of durable and rugged construction with all parts readily accessible for replacement or repairs.

I claim:

1. In a seat structure having a subframe, a seat frame having a seat part arranged immediately above said subframe, a forward U-shaped yoke having its cross part journalled on said sub-frame to swing about a horizontal transverse axis and having its arms projecting forwardly and upwardly and pivotally connected to the front of said seat part and a rear U-shaped yoke having its cross part journalled on said subframe to swing about a horizontal transverse axis and having its arms projecting forwardly and upwardly and pivotally connected to the rear of said seat part, the combination with said subframe and said seat frame of a resilient support for the latter, comprising a pair of transverse rows of helical compression springs interposed between and in engagement with said subframe and seat part and each arranged immediately in advance of the cross part of a corresponding one of said yokes.

2. In a seat structure having a subframe including side rails, a seat frame including a seat part arranged immediately above said subframe, springs interposed between said subframe and seat part, a forward U-shaped yoke having its cross part journalled in end bearings on the forward ends of said side rails to swing about a horizontl transverse axis, the arms of said yoke extending upwardly and forwardly, means pivotally connecting the outer ends of said arms to said seat part of said seat frame, a rear U-shaped yoke having its cross part journalled in end bearings on the rear ends of said side rails to swing about a horizontal transverse axis, the arms of said rear yoke extending upwardly and forwardly and means pivotally connecting the outer ends of said arms to said seat part of said seat frame, the combination with said subframe and said seat frame of a resilient support for the latter, comprising a pair of transverse rows of helical compression springs interposed between and in engagement with said subframe and seat part and each arranged immediately in advance of the cross part of a corresponding one of said yokes, a pair of short depending crank arms fast to the cross part of each of said yokes and each arranged adjacent the corresponding one of said bearings and outside of the corresponding side rail, and a connecting rod pivotally connecting the pair of crank arms at each side of said subframe.

ALBERT F. HICKMAN.

References Cited in the file of this patent

UNITED STATES PATENTS

| Number | Name | Date |
|---|---|---|
| 533,009 | Holland et al. | Jan. 22, 1895 |
| 1,300,853 | McDonald | Apr. 15, 1919 |
| 1,353,340 | Heitzenreder | Sept. 2, 1920 |
| 1,769,434 | Jones | July 1, 1930 |
| 1,958,481 | Lee | May 15, 1934 |
| 2,241,909 | Hoven et al. | May 13, 1941 |
| 2,253,914 | Probst | Aug. 26, 1941 |
| 2,261,996 | Haberstump | Nov. 11, 1941 |
| 2,286,168 | Flint et al. | June 9, 1942 |
| 2,357,825 | Hickman et al. | Sept. 12, 1944 |
| 2,486,048 | McIntyre et al. | Oct. 25, 1949 |

FOREIGN PATENTS

| Number | Country | Date |
|---|---|---|
| 634,647 | Germany | Sept. 1, 1935 |
| 499,162 | Great Britain | Jan. 19, 1939 |